A. E. BUCHENBERG.
ELECTRIC WELDING APPARATUS.
APPLICATION FILED SEPT. 25, 1909.

966,382.

Patented Aug. 2, 1910.

2 SHEETS—SHEET 1.

WITNESSES:
D. C. Walter
C. H. Bills

INVENTOR.
Alvin E. Buchenberg,
By Owen & Owen,
His attys.

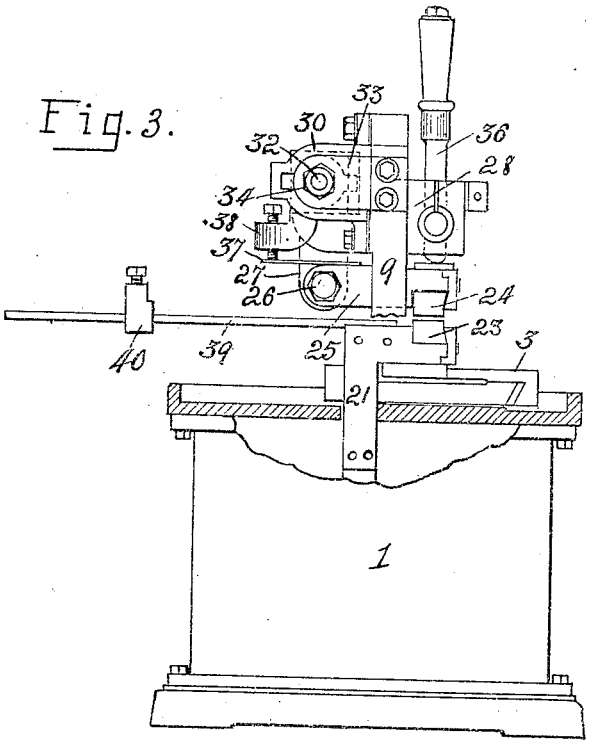
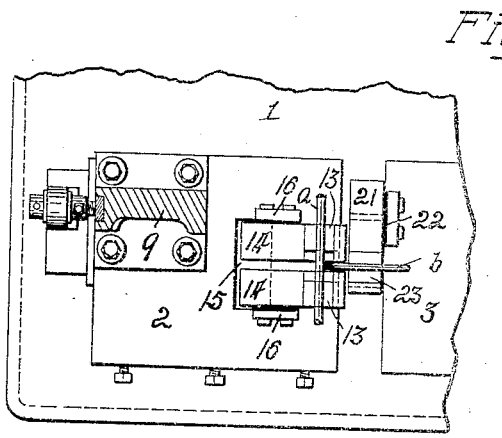

UNITED STATES PATENT OFFICE.

ALVIN E. BUCHENBERG, OF TOLEDO, OHIO, ASSIGNOR, BY MESNE ASSIGNMENTS, TO THE TOLEDO ELECTRIC WELDER COMPANY, OF CINCINNATI, OHIO, A CORPORATION OF OHIO.

ELECTRIC WELDING APPARATUS.

966,882.

Specification of Letters Patent. Patented Aug. 2, 1910.

Application filed September 25, 1909. Serial No. 519,620.

*To all whom it may concern:*

Be it known that I, ALVIN E. BUCHENBERG, a citizen of the United States, and a resident of Toledo, in the county of Lucas and State of Ohio, have invented a certain new and useful Electric Welding Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to electric metal working apparatus, and has particular reference to what is known as double welding apparatus in which one or a set of pieces of metal are welded to the side of another piece at an angle thereto, but is not restricted to such use, as the whole or the novel features of the same may be employed in any other connection for which they may be appropriate.

The object of my invention is to provide an apparatus of this class which is adapted for the welding of articles of large area, such as buggy dashes, fender irons, etc., and which is simple and efficient in its operation and strong and durable in its construction.

The operation, construction and arrangement of the parts of the invention are fully described in the following specification, and a preferred embodiment thereof is illustrated in the accompanying drawings, in which,—

Figure 1:
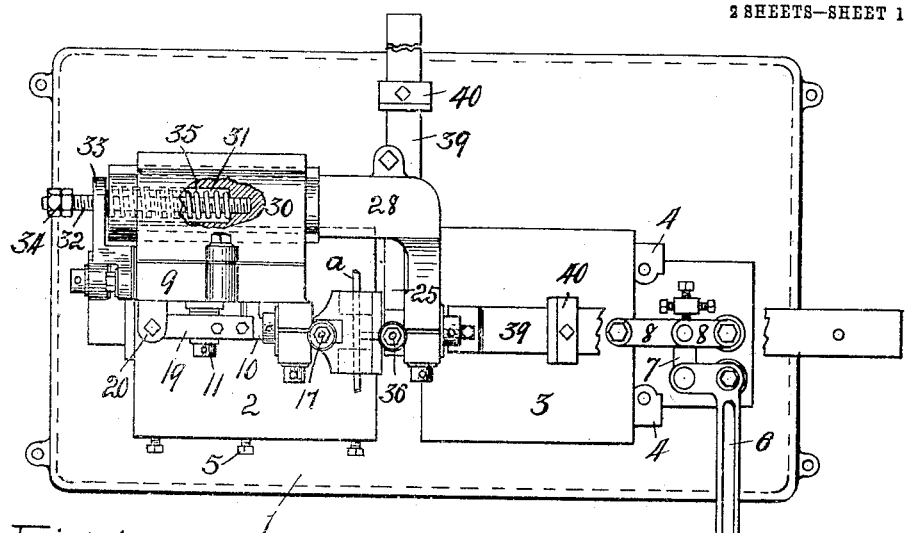
Figure 2:
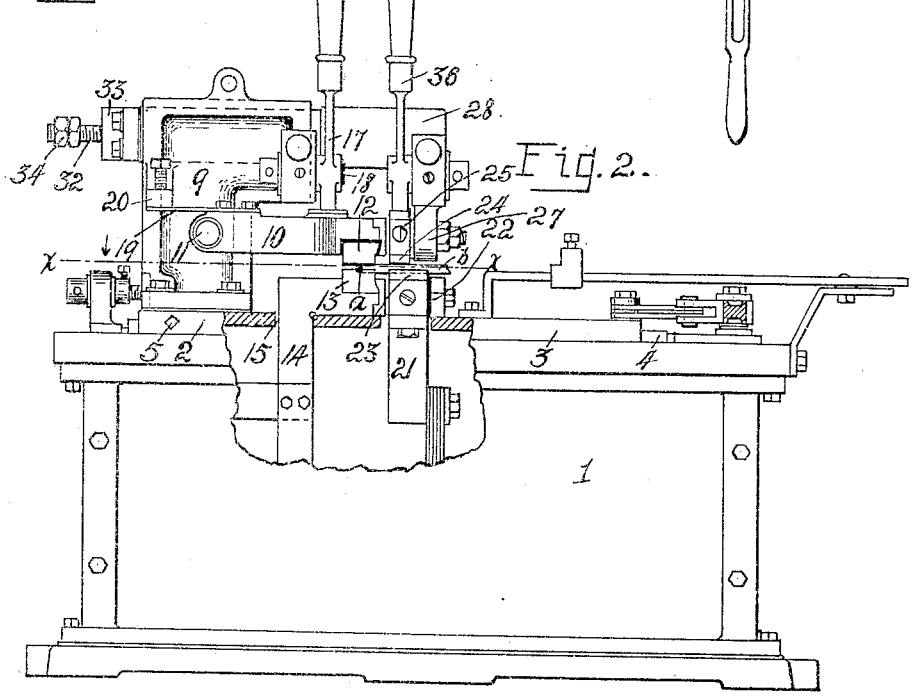

Figure 1 is a plan view of the invention with portions broken away. Figs. 2 and 3 are side and end elevations, respectively, thereof with portions of each broken away, and Fig. 4 is a section on the line *x x* in Fig. 2.

Referring to the drawings, 1 designates the base or frame of the machine on the top of which are mounted the normally fixed table 2 and the reciprocally movable table 3. The table 3 is capable of to and fro movements on guides 4 relative to the table 2, and the table 2 is held in properly adjusted position on its guides (not shown) by set-screws 5, see Fig. 1. The movements of the table 3 may be controlled in any suitable manner, as by a bell-crank lever 6, which is shown as fulcrumed to the frame top, and has the short arm thereof connected by a link 7 to the inner ends of a set of toggle-links 8, 8, which have their outer ends pivotally attached to the outer end of the table 3 and to the frame top, respectively, as shown in Fig. 1.

Rising from the table 2 is a standard 9 to one side of which a jaw-carrying lever 10 is pivoted, as at 11, and extends longitudinally of the frame with its free end disposed in the direction of the table 3. This lever is shown as having its free end horizontally broadened and carries a pair of transversely spaced work-gripping jaws 12, which coöperate with a pair of subjacent jaws 13 to grip a part of the work being welded. Each of the jaws 13 is carried by one of the terminals or leads 14, 14 of the secondary of a suitable transformer (not shown) which is customarily mounted within the frame or base 1. The terminals 14 are shown (Figs. 2 and 4) as projecting through an opening 15 in the table 2 and as being insulatingly bolted or screwed to the inner sides of bosses 16, 16 formed on the top of such table. The jaw-carrying lever 10 is depressed by any suitable means, such as a cam lever 17, which is fulcrumed on a stud 18 projecting from the upper portion of the standard 9, and has its cam portion coacting with the top of the lever 10. A spring 19 acts on the lever 10 and a coacting lug 20 on the standard 9 to normally retain the free end of the lever 10 elevated. A third terminal or lead 21, having flexible connection with the secondary of the transformer, is insulatingly secured to the end of the table 3, which is adjacent the table 2, as indicated at 22, Figs. 2 and 4, and carries a work supporting jaw or part 23 on its top. Coöperating with this jaw to grip the work, is an upper jaw 24, which is carried at the under side of the free end of a lever 25. This lever is pivoted, as at 26, Fig. 3, to a boss 27 projecting downwardly from an arm 28, which arm projects away from the inner end of the table 3 along the side of the standard 9 which is opposed to the side on which the lever 10 is disposed and has its outer end mounted for free longitudinal sliding movements in a guide head 30, which is carried in elevated position in any suitable manner by the standard 9.

Projecting into a longitudinal socket or bore 31 in the outer end of the arm 28 and threaded into the base of such socket, is a rod 32, which has its outer end projected beyond the end of said arm through a registering aperture in an arm 33, and carries a nut or head 34 without such arm 33 for coacting with the outer side thereof to limit the movement of the arm 28 in the direction of the table 3. The arm 33 projects laterally from the outer side or end of the standard 9, and in addition to serving as a stop for limiting the inward movement of the arm 28 also serves as a thrust plate for the outer end of a coiled compression-spring 35, which encircles the rod 32 and has its inner end thrust against the base of the socket 31, see Fig. 1. This spring acts to normally retain the arm 28 at its limit of inward movement, as hereinafter more fully described. The nut or head 34 on the rod 32 is adjustable thereon to regulate the throw of the arm 28.

The inner end of the arm 28, or that which is adjacent to the table 3, is laterally angled to extend over the inner end portion of the table 3 and carries a cam-lever 36, which serves to depress the jaw-carrying lever 25. A spring 37 projects from the inner end of the lever 25 and co-acts with a portion 38 of the arm 28 to serve to retract the lever 25 from depressed position when released by the lever 36. It is thus apparent that by mounting the arm 28 in elevated position and extending it from above the inner end of the table 3 to adjacent the outer end of the table 2 provides a space of suitable height and breadth to permit the introduction of work of any area between the work gripping parts.

Supports or rests 39, 39 for the work are provided on the top of the machine, as indicated, and carry adjustable gage blocks 40.

In using the apparatus, the operator clamps a piece of work, as $a$, between the dies or jaws 12—13 by a manipulation of the controlling lever 17, and then clamps the piece of work, as $b$, which is to be welded to the side of the piece $a$, between the dies or jaws 23—24 with its end projected toward the piece $a$ in position to make contact with the side thereof intermediate the sets of dies 12—13 when the tables 2, 3 have relative movements toward each other. The pieces of work having been gripped between the respective work-holding parts, a heating current is passed through the leads or terminals 14, 14 and interposed work $a$, which completes the circuit, and is permitted to flow until the piece $a$ has been sufficiently heated to reduce it to the desired state of plasticity to facilitate a welding of the other piece $b$ thereto. The operator now works the means controlling the movements of the table 3, which in the present instance is the lever 6, to move such table toward the table 2 and the end of the work $b$ into contact with the side of the work $a$, as indicated in the drawings. The secondary current is now switched to pass through one of the heads 14, associated die 13, the contacting pieces of work $a$—$b$, die 23, and lead 21, or vice versa, thus effecting a welding together of said pieces. On a movement of the table 3 toward its companion, the arm 28 is caused to have a corresponding movement within the guide-head 30 against the tension of the spring 35, due to the friction created between the work and the work-gripping parts thereof when clamped. On a release of the work clamping parts when the pieces $a$—$b$ have been welded, the arm 28 actuated by the spring 35 returns to its normal extended position, with its jaw 24 disposed directly over the jaw 23 of the table 3 when such table is in retracted position, the return movement of such arm being regulated by an adjustment of the stops 34 on the rod 32.

While the means for controlling the flow of the heating currents through the several leads of the machine forms no part of the present invention, a preferable method of accomplishing this is described and claimed in United States Letters Patent No. 932,441, granted to me on August 31, 1909.

I wish it understood that my invention is not limited to any specific construction or arrangement of the parts except in so far as such limitations are specified in the claims.

Having thus described my invention, what I claim as new and desire to secure by Letters Patent, is,—

1. In an electric metal-working apparatus, the combination of a set of clamping dies for gripping opposed sides of a work piece, of carrying parts for such dies mounted for reciprocatory movements together and relative to each other.

2. In an electric metal-working apparatus, a reciprocatory work-support, a part cooperating therewith to clamp the work, and means carrying such part and capable of yielding movements in the direction of movement of the work support and relative thereto.

3. In an electric metal-working apparatus, a reciprocatory work-support, a part cooperating therewith to clamp the work, and means carrying such part and capable of reciprocatory movements longitudinally of the plane of movement of said work-support and independently of said support, for the purpose described.

4. In an electric metal-working apparatus, a plurality of sets of work-holders, capable of relative to and fro movements, means carrying a holding part of one of said sets of work-holders, and capable of movements relative to the companion holding part and longitudinally of the plane of relative movements of said holders, for the purpose described.

5. In an electric metal-working apparatus the combination with a movable work-support of a part spaced from such support and capable of independent movements longitudinally of the direction of movement of said support, and means carried by said part and adapted to coöperate with the support to clamp work thereto.

6. In an electric metal-working apparatus, the combination with two sets of relatively movable work-holding parts, of means carrying a holding part of one of such sets and capable of movements longitudinally of said work-holding parts and relative thereto, and means normally holding said first means in one position of its movement.

7. In an electric metal-working apparatus, the combination with two sets of relatively movable work-holding parts, of means reciprocally carried at the side of one set of such parts and projecting past such set and to adjacent the other set and carrying one of the holding parts of said other set and yielding means normally holding said means in one position of its movement.

8. In an electric metal-working apparatus, the combination with a movable work-holding part of a reciprocatory arm movable longitudinally of the movement of said part and relative thereto, a coöperating work-holding part carried by said arm, and means normally retaining said arm in one position of its movement.

9. In an electric metal-working apparatus, two relatively movable sets of work-holding parts, an arm carrying the upper holding part of one of such sets, said arm rising from the opposed side of the other set of work-holders, and being movable relative to each set of work-holders.

10. In an electric metal-working apparatus, a set of movable work-holding parts, an arm carrying one of such parts and movable in the direction of movement of said parts, and means normally influencing a movement of said arm in one direction.

11. In an electric metal-working apparatus, a set of work-holding parts, a reciprocatory arm carrying one of such parts, means guiding the movements of such arm, and spring means influencing the movement of said arm in one direction.

12. In an electric metal-working apparatus, the combination with a movable work-gripping part, of a coöperating gripping part, and means carrying said latter part for yielding movements in the direction of movement of said other part.

13. In an electric metal-working apparatus, the combination with a movable work-holding part, of a coöperating holding-part, means for controlling the gripping movements of said parts, and means carrying said controlling means and mounted for yielding movements in the direction of movement of said movable part.

14. In an electric metal-working apparatus, a work-support capable of reciprocatory movements, a member mounted in advance of one end of said support and projecting to adjacent such end, said member being capable of yielding movements in the direction of movement of the work-support, and a clamping part carried by such member and adapted to coöperate with said support to hold work.

15. In an electric metal-working apparatus, the combination with a support for one part of the work, of the coöperating support or clamp, and means carrying the upper member of the last support and rising from the same side of the work as the first support, whereby the apparatus is rendered capable of receiving work of any area, said means being capable of yielding movements relative to said last support and toward said first support.

16. In an electric metal-working apparatus, the combination with a support for one part of the work, of the coöperating relatively movable support or clamp, and an arm bearing the upper member of said latter support and extending to the back of the first support, and means at the back of said first support for carrying said arm for reciprocatory movements relative to the last support and normally influencing its movements in one direction.

17. In an apparatus of the class described, the combination with a work support, of a coöperating support, a standard disposed to the rear of one support, and a part carried for yielding reciprocatory movements by said standard and carrying the upper member of the other support, for the purpose described.

18. In an electric metal-working apparatus, the combination with two relatively movable work-supporting parts, of an arm carrying the upper clamping member of one of such parts, means at the rear of the other part for supporting such arm for reciprocatory movements, spring means influencing the movement of said arm in one direction, and means limiting its movement in such direction.

19. In an electric metal-working apparatus, the combination with a movable work-support and a coöperating upper clamping member, of means carrying such member and capable of movement with said support when said member is clamped to the work, and means independent of said support for influencing a return of said first means to normal position when its member is released from the work.

In testimony whereof, I have hereunto signed my name to this specification in the presence of two subscribing witnesses.

ALVIN E. BUCHENBERG.

Witnesses:
C. W. OWEN,
CORNELL SCHREIBER.